3,851,075
PROCESS FOR IMPARTING DESIGN ON SURFACES OF FOOD MATERIAL

Lawrence W. Wisdom, Dallas, Tex., assignor to Frito-Lay, Inc., Dallas, Tex.
Filed Sept. 8, 1972, Ser. No. 287,455
Int. Cl. A21a 8/02; A23l 1/27
U.S. Cl. 426—250     4 Claims

ABSTRACT OF THE DISCLOSURE

There is disclosed a continuous process for imprinting a design on a ribbon of food material. A ribbon of food material is continuously passed between two moving surfaces, each of the surfaces having raised portions in contact with the ribbon. The raised portions on the surfaces are coated with an edible food coloring dye which is transferred to the surface of the ribbon, thereby creating a design on each surface of the ribbon.

---

This invention relates to a process for imprinting a design on food items. More particularly, this invention relates to a continuous process for printing a design on a ribbon of food material.

In producing food items, it is sometimes desirable to create a specific design on the surfaces thereof. For example, in the production of bacon-flavored food chips from a cereal dough, it is desirable to have them colored so as to simulate fried bacon. U.S. Pat. No. 3,589,914 obtains a bacon appearance by extruding two different doughs, one dough being colored a reddish brown to simulate the appearance of the lean portion of cooked bacon and the other dough being uncolored to simulate the fatty portion of bacon. U.S. Pat. No. 3,320,070 discloses the production of a bacon-like product by coloring zones of proteinaceous food pieces to simulate the lean portions of meat, preferably by a color-stamping device.

It is an object of this invention to provide a novel process for imprinting food products with a design.

It is another object of this invention to provide a continuous process for imprinting a design on a ribbon of food material.

These and other objects are attained by the practice of this invention which, briefly, comprises continuously passing a ribbon of food material between two moving surfaces. Each of the surfaces has raised or embossed portions in contact with the ribbon. The raised portions on the surfaces are coated with an edible food coloring dye which is transferred to the surface of the ribbon, thereby creating a design on each surface of the ribbon.

This invention will be more particularly defined with reference to the accompanying drawing in which.

Figure 1:
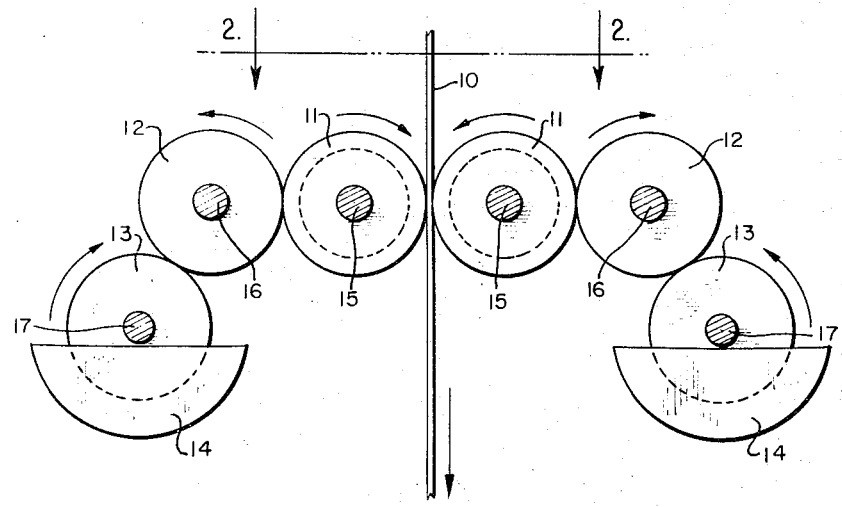
FIG. 1 is a schematic view of means for practicing the process of this invention.
Figure 2:
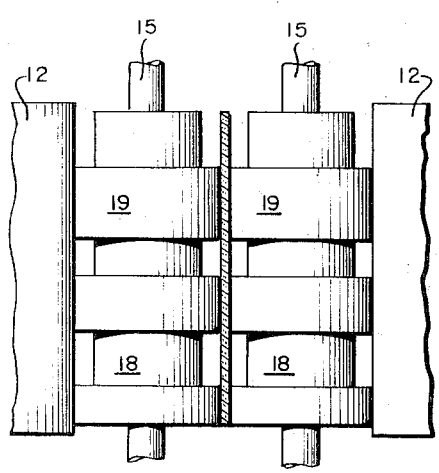
FIG. 2 is a sectional view taken on line 2—2 of FIG. 1.

The material used to prepare the ribbon of food material in the process of this invention is preferably a starchy or farinaceous material which is formed into a dough. The dough may be formed from the starchy material, e.g., by adding moisture to a meal or flour derived from corn, wheat, rice, oats, barley, potatoes, tapicoa, etc. The dough may be prepared by techniques well known in the art. Thus, the dough may be prepared my mixing a liquid, such as water, with dry starchy material such as flour. The dough should contain enough liquid so that it may be further processed without crumbling, e.g., from about 20 to 55% by weight.

The ribbon of food material may be formed by extruding the dough by means of a conventional extruder. During passage of the dough through the extruder, it may be subjected to elevated temperatures which will gelatinize starch contained in the dough.

Referring to the drawing, it will be seen that the apparatus used in the process of this invention may comprise two sets of three rolls, each set situated on opposite sides of the food ribbon 10. Each set of rolls comprises a printing roll 11, a roll 12 which transfers a food dye or ink to the printing roll 11, and ink rolls 13. The ink rolls 13 are partially submerged in food dye contained in the reservoirs 14. The ink may be any generally accepted food coloring material such as F. D. & C. dyes.

Each of the rolls 11, 12 and 13 are mounted on shafts 15, 16 and 17, respectively. The shafts 15, 16 and 17 are connected to drive means, not shown, for imparting rotary movement to the rolls 11, 12 and 13 in opposite directions. Thus, the roll 11 rotates so that its upper surface is moving toward the ribbon 10; and roll 12 rotates so that its lower surface is moving toward the roll 11; and the roll 13 rotates so that its upper surface moves toward the roll 12. In the embodiment shown wherein each of the rolls is the same diameter, each roll continuously rotates at the same speed as the other rolls.

Each ink roll 13 has a rubber surface which picks up the ink from the ink reservoir 14 and deposits it on the surface of the roll 12. The roll 12 has an etched surface— i.e., the surface contains a large number of minute depressions. These depressions collect the ink from the ink roll 13 and deposit it on the printing roll 11.

Each printing roll 11 comprises a plurality of grooves or lower portions 18 and ridges or raised portions 19. The ink rolls 11 are situated so that the ridges on one roll are directly opposite the ridges on the other roll and are spaced apart a distance equal to the thickness of the ribbon 10.

Figure 3:
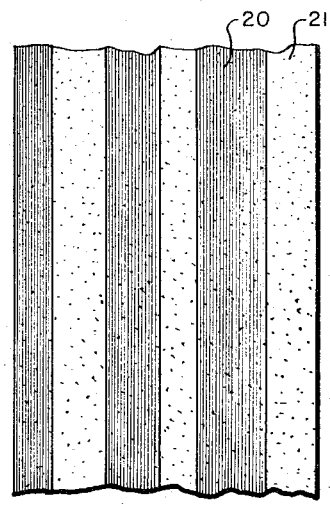
FIG. 3 is a view of a portion of a ribbon of food material which has been colored by the process of this invention to simulate the appearance of bacon.

Ink is applied to the ridges 19 by the rolls 12. The ridges make contact with the surface of the ribbon 10 and apply the ink thereto. If the ribbon of food material is originally light in color and the ink is darker in color, the ridges will impart dark stripes where they contact the food ribbon 10, and, in the area of the grooves 18, the food ribbon will remain light. As shown in FIG. 3, this provides alternate dark stripes 20 and light stripes 21. The resulting stripes are in register on both sides of the ribbon and give the appearance of solid stripes through the internal part of the resultant product even though the dye is only on the surface of the ribbon.

After the food ribbon 10 has had the design printed on the surface thereof, it may be cut into pieces and the pieces may be further processed by a conventional technique. For example, if the desired product is to be used as a snack item, the pieces may be baked or fried in deep fat to provide a puffed product.

The following example illustrates the process of this invention:

EXAMPLE

A dough is formed from wheat flour having a moisture content of about 25%. A bacon flavored seasoning is added and the dough is extruded into a light colored ribbon. The ribbon is passed between two printing rolls as previously described which apply a reddish brown ink in continuous stripes. The ribbon is cut into pieces and the pieces are dried to a moisture content of about 10%. The pieces are then fried in hot cooking oil. During frying, the pieces expand to form puffed chips. The finished products have alternating stripes of light color which simulate the appearance of the fatty portion of bacon and reddish brown color which simulate the appearance of the lean portion of bacon.

There are many variations to the specific embodiment shown which are within the scope of the present invention. Therefore, the invention is not limited to the embodiment shown, but encompasses numerous modifications. For example, designs other than stripes may be imprinted on the surface of the ribbon of food material.

I claim:

1. A process for continuously imprinting a bacon-like appearance on a ribbon of food material which comprises continuously passing said ribbon of food material between two rolls, each of said rolls having ridges thereon, the ridges on one roll being directly opposite the ridges on the other roll, applying an edible dye having a color which simulates the coloring of the lean portion of bacon to said ridges, said ridges making contact with the surface of said ribbon, thereby applying said dye thereto to print stripes on said ribbon, said stripes being in register on both sides of said ribbon, thereby creating alternating stripes of light color which simulate the appearance of the fatty portion of bacon and stripes of a color which simulate the appearance of the lean portion of bacon on each surface of said ribbon, thereafter cutting said ribbon into pieces and frying said pieces.

2. A process as defined in claim 1 wherein said ribbon is comprised of a farinanceous material.

3. A process as defined in claim 1 wherein said ribbon is formed by extruding a dough of a farinanceous material.

4. A process as defined in claim 3 wherein said dough contains from about 20 to 55% by weight of moisture.

References Cited

UNITED STATES PATENTS

| | | | |
|---|---|---|---|
| 3,344,753 | 10/1967 | Ramsey | 118—221 |
| 1,619,081 | 3/1927 | McLaurin | 118—221 X |
| 3,325,302 | 6/1967 | Hesteld | 117—11 |
| 3,120,449 | 2/1964 | Griswold | 117—14 |
| 2,873,204 | 2/1959 | Hochuli et al. | 117—11 |
| 3,027,258 | 3/1962 | Markakis et al. | 99—81 |

RAYMOND N. JONES, Primary Examiner

U.S. Cl. X.R.

426—104, 383, 496